March 28, 1933.   A. B. SMALL   1,903,199
AUTOMATIC SAFETY REVERSE MOTION LOCK
Filed March 5, 1930   3 Sheets-Sheet 1

WITNESS
C. B. Shillinger

INVENTOR
A. B. Small
BY
Munn & Co.
ATTORNEY

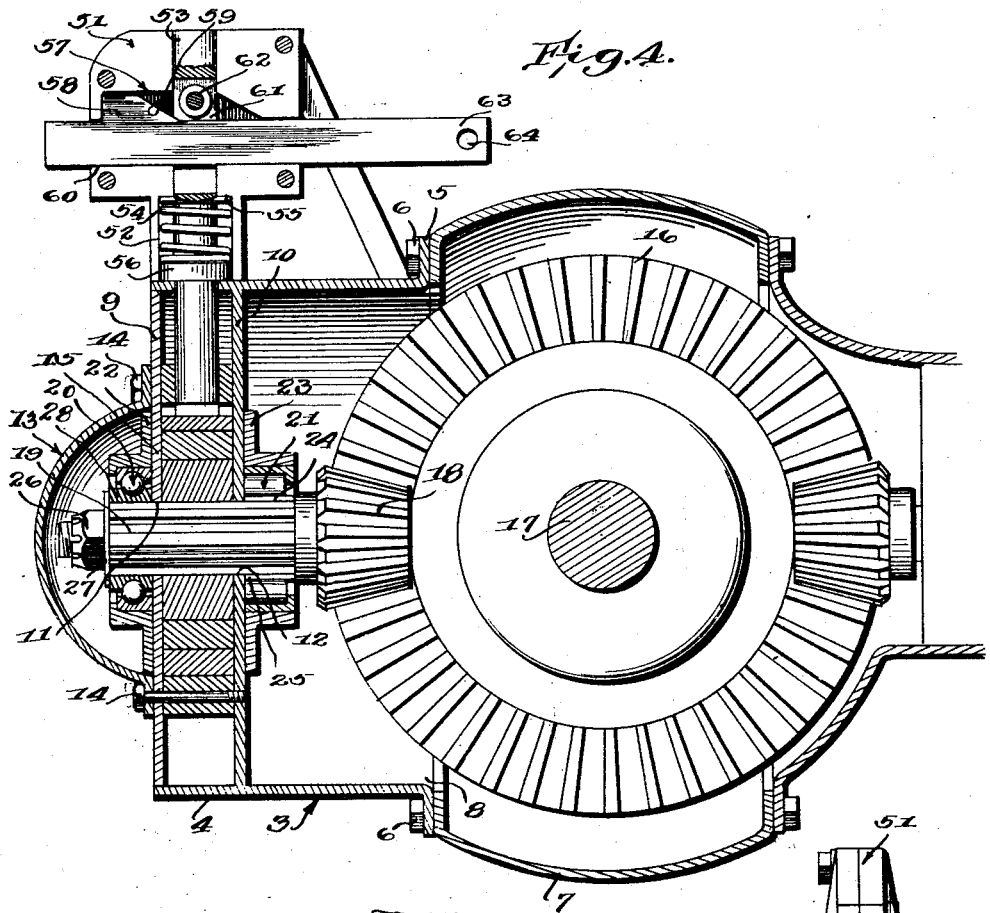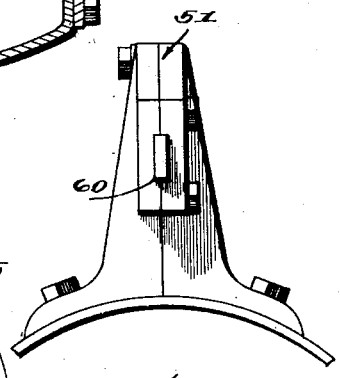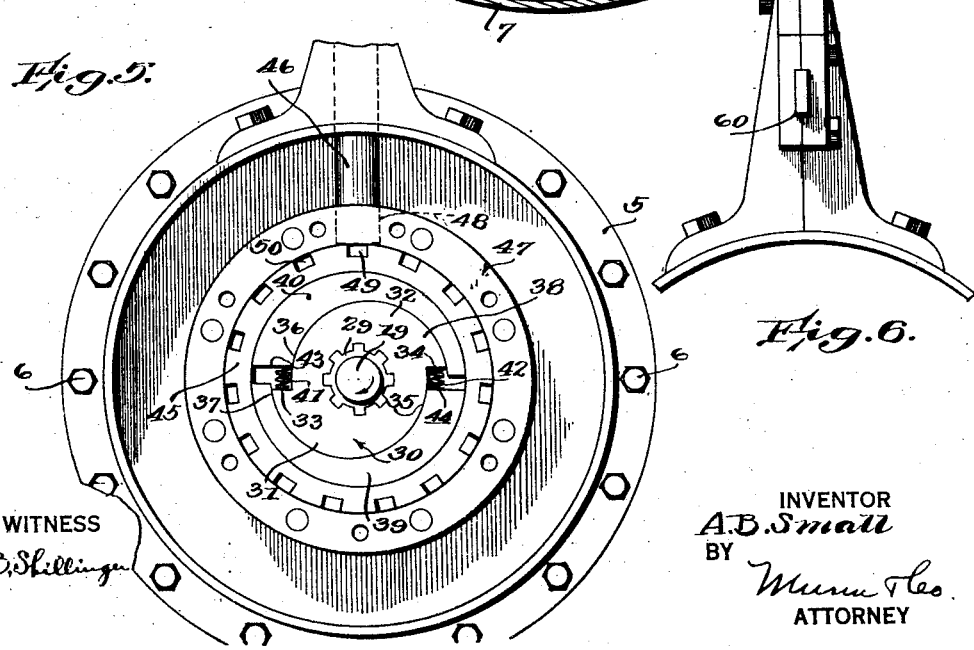

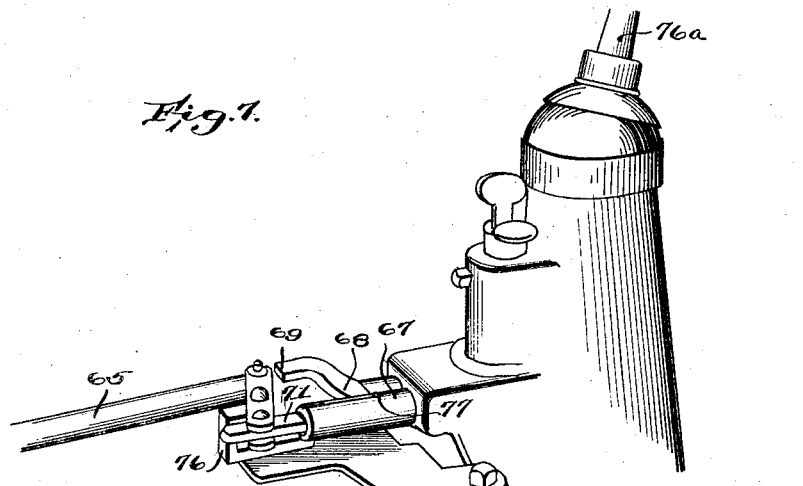
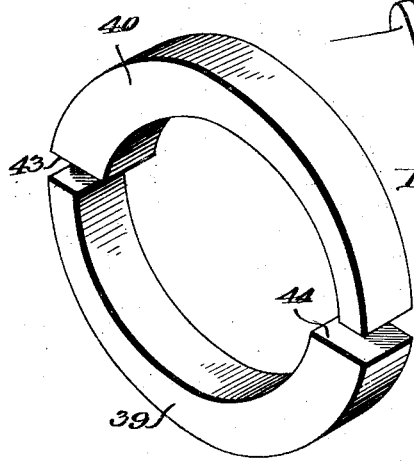
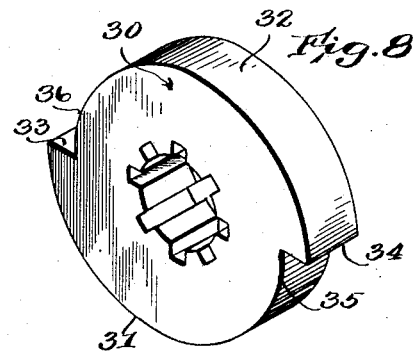
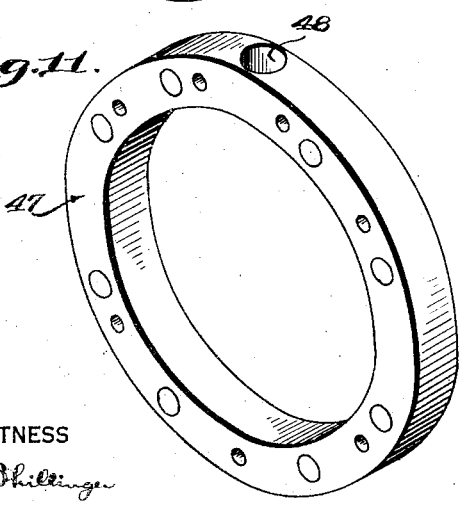
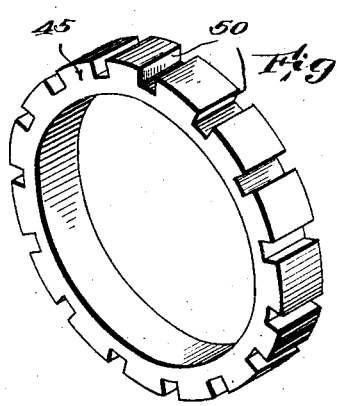

Patented Mar. 28, 1933

1,903,199

UNITED STATES PATENT OFFICE

ALFRED B. SMALL, OF MIAMI, FLORIDA

AUTOMATIC SAFETY REVERSE MOTION LOCK

Application filed March 5, 1930. Serial No. 433,333.

My invention relates to automatic safety reverse motion locks for use on shafts of any nature, more particularly for use on shafts of automobiles, elevators, hoisters, railway cars and the like, and it consists in the combinations, arrangements and constructions herein shown and described.

This device is designed as an improvement over the invention disclosed in my Patent No. 1,653,515, dated December 20, 1927.

As is well known to all operators of automobiles of conventional construction inconvenience and sometimes serious difficulty is encountered in manipulating the throttle, the clutch, the shift lever and the hand and foot brakes, when starting up an incline after parking or otherwise stopping the automobile. It is, therefore, a primary object of my invention to provide an automatic brake for general use and which may be controlled by the movements of the gear shift and is adapted to prevent retrograde movement upon movement of said gear shift to the forward speed positions thus eliminating the necessity of attention to the brakes on the part of the operator.

A further object of my invention is to provide a device of the type described, which will be released, automatically when the gear shift is moved to reverse or to neutral from reverse to allow rearward movement of the vehicle by the operator under its own power or an extraneous force.

A further object of my invention is to provide a device of the type described, which will be readily releasable at the will of the operator.

A further object of my invention is to provide a one-way brake which may be utilized between any members, which are to have relative movement in one direction only, such as the operating parts of jacks, screw-drivers, augers, wrenches, etc.

A further object of my invention is to provide a device of the type described, which has few parts, is simple to manufacture, and does not get out of order easily.

Other objects and advantages will appear as the specification proceeds and the invention will be more particularly pointed out in the appended claims.

Figure 1:
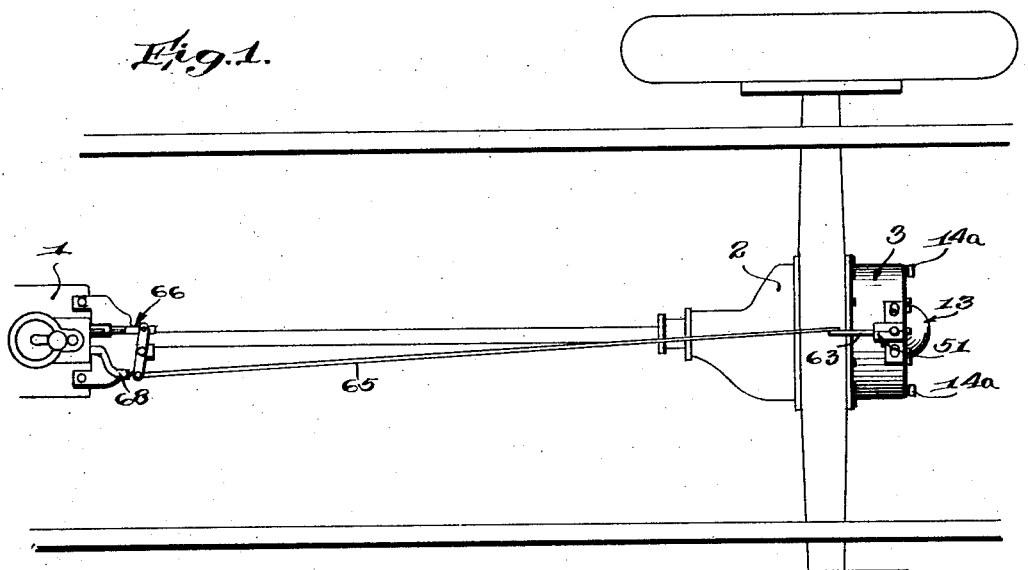
Figure 2:
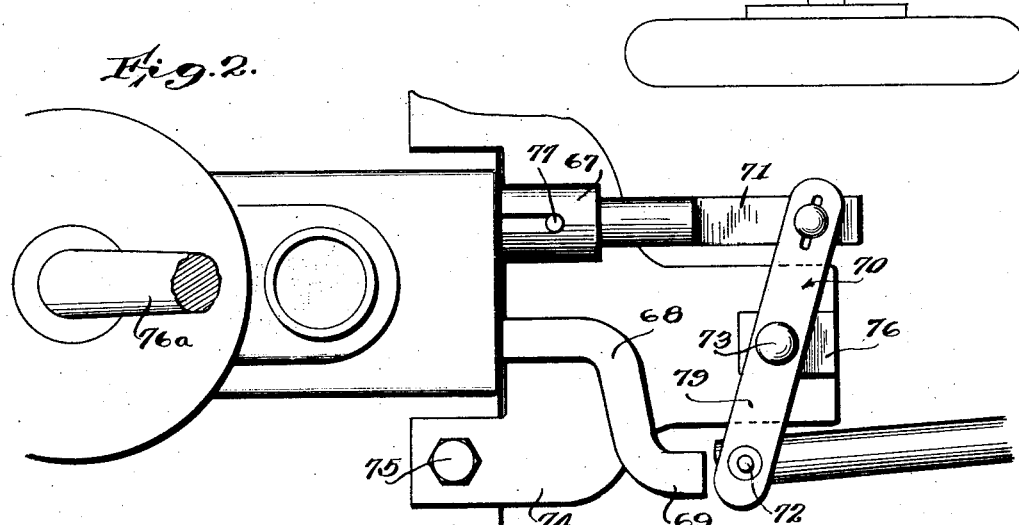
Figure 3:
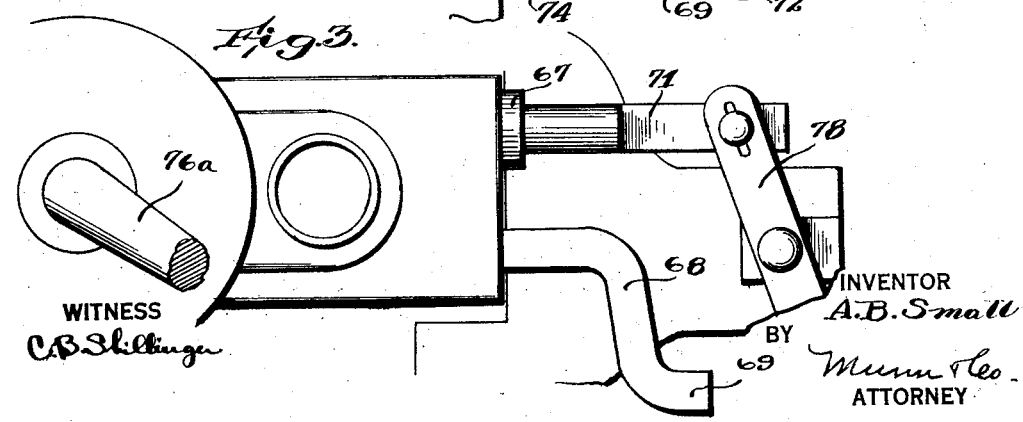

My invention is illustrated in the accompanying drawings forming a part of this application, in which Figure 1 is a plan view of the device, Figure 2 is a detail plan view of a portion of the device shown in one operative position, Figure 3 is a detail plan view of a portion of the device shown in another operative position, Figure 4 is a sectional detail view of a portion of the device with parts thereof shown in elevation, Figure 5 is an elevational detail view of a portion of the device with parts thereof removed for clearness of illustration, Figure 6 is an elevational detail view of a part of the device, Figure 7 is a perspective detail view of a portion of the device, and Figures 8 to 11 inclusive, are perspective detail views of portions of the device.

For purposes of illustration, I show my device applied to an automobile having a transmission of conventional construction. The device is shown with controls therefor that synchronizes the on and off positions of the device with the positions occupied by the controls of the automobile within the transmission. As illustrated, the device is shown applied just to the rear of the differential gearing. It is understood, however, that the same is readily applicable to the drive shaft at any position there-along, to the rear axles, to the side of the ring gear or to any other portion of the running gear which is feasible.

The invention comprises essentially, a one-way brake which is adapted for operative connection and disconnection to the shaft, or member whose movement it controls.

In applying the invention to a differential I may connect it directly to the ring gear or to an auxiliary shaft engageable with said ring gear. I illustrate the latter embodiment.

In carrying out my invention, I make use of an ordinary automobile equipped with a transmission 1 and a differential 2 of conventional construction. In adapting the differential to my invention, I remove the end-plate thereof, not shown, and mount in place thereof, the housing 3 particularly constructed in accordance with my invention.

This housing 3, as shown more clearly in Figure 4, comprises a cylindrical drum-shaped member 4 having a flange 5 at the open-end thereof, with apertures for the reception of bolts 6 which are utilized to secure the housing 3 in fixed position to the main housing 7 of the differential. The open-end 8 of this particularly constructed housing 3 permits ready communication from the interior thereof, to the interior of the main differential casing 7.

It is obvious that this housing may be made of any desirable form or required construction, which may be necessitated by the construction of the particular portion of the particular make of car to which it is being adapted.

The casing 3 is shown provided with an end-wall or plate 9 and a partitioned wall or plate 10 in spaced relation therewith, within the drum. These plates 9 and 10 have bores 11 and 12 for mounting the operative shaft of the device as will presently be described. A dome-shaped end-plate 13 is fastened by the means shown at 14 to the end-plate 9 for housing certain portions of the device, as appears more clearly in Figure 4.

The end plate 9 is sprung into the casing 3, and the elongated bolts 14ᵃ provided for threaded engagement with said plate 9 and for free engagement through the stationary ring and into abutment with partition wall 10. These bolts 14ᵃ are longer than the bore receiving them, thus providing a simple expedient for forcing the end plate outwardly when desired.

In this illustration, the one-way brake generally indicated at 15 is adapted to control the movements of the ring gear 16 of the differential 2 with consequent control of the movements of the wheels operated through said differential by connection to the shaft 17 and a similar shaft, not shown, by means of the pinion 18 cooperating with the ring gear 16 and driving therefrom, the shaft 19 of my device.

This shaft 19, as is shown clearly in Figure 4 is mounted for rotation within the apertures 11 and 12 by means of the anti-friction bearings 20 and 21 affixed to the externally disposed surfaces of the walls 9 and 10, by any suitable means such as the flanges 22 and 23. A suitable collar 24 provides a shoulder 25 for engagement with the wall 10 to limit movement longitudinally of said shaft in one direction, in this case to the rear. A lock nut 26 and associated washer 27 secured upon the opposite end of the shaft 19 engage the bearing member 28 of bearing 20 to secure the shaft against longitudinal movement in the reverse direction. This shaft 19 is suitably splined as shown at 29 for mounting an operating part of the device as will soon appear.

The operative parts of the one-way brake portion of my invention shown in this embodiment comprise the bilobated cam 30 having the similar but oppositely disposed cam surfaces 31 and 32 and the stop shoulder portions 33 and 34 adjacent said surfaces respectively. As appears in Figure 5, the cam surfaces 31 and 32 extend radially outward in the form of a portion of a spiral from portions 35 and 36 respectively of reduced radii to portions 37 and 38 respectively of increased radii adjacent the stops 33 and 34.

For operation by the bilobated cam 30, the similarly formed and oppositely disposed brake shoes 39 and 40 are shown. As further appears more clearly in Figure 5 these brake shoes 39 and 40 are formed to cooperate with the cam 30 for operation by the cam surfaces 31 and 32 of said cam and for cooperative engagement with the stop shoulders 33 and 34 of said cam. This cooperative engagement between the brake shoes 39 and 40 and the stop shoulders 33 and 34 of the cam is accomplished through the resilient means 41 and 42, which may be of any suitable construction, but is shown in the form of spiral compression springs. It is obvious that these springs, being engaged between shoulders 33 and 34 on the cam and shoulders 43 and 44 on the brake shoes will normally urge said brake shoes outwardly with reference to one another as well as to the cam and into frictional engagement with a ring member 45 all for an operation that will soon be made clear.

It is understood that a greater or lesser number of cooperating cam surfaces and shoes than the two sets shown may be utilized without departing from the scope of my invention, the number of such members being increased or decreased as desired.

This ring member 45, I term the notched ring. It is mounted for free rotation during certain operative positions of the automobile controls or other vehicle to which it is applied. The notches in the outer periphery thereof, however, provide a suitable construction for locking said ring against movement by means of the engagement therewith of the plunger 46 mounted for reciprocation in a ring 47 which is stationarily positioned on or made integral with the plates 9 and 10 of the casing 3. In the embodiment illustrated, the ring 47 is shown secured between said plates by the engagement therethrough of the bolts 14. The bolt 46 has the enlarged portion, which engages with the edges 48 of the bore in the ring 47 and a reduced portion 49 for engagement with the notches 50 of the ring 45.

For actuating the plunger 46 into engagement with the notches 50 and for withdrawing the same therefrom when it is desired to control the operation of the one-way brake, the means cooperating with said plunger 46 and shown most clearly in Figure 4 is provided. As appears in said figure, a housing 51 is provided having a bore 52 therein, for encasing a portion of the bolt and a reduced bore 53 therein, for encasing another portion of the bolt.

The means within the housing 51 is adapted for normally urging the bolt 46 into engagement with one of the notches 50 in which position the one-way brake is operative. This is accomplished by mounting a resilient means such as the spring 54 in the bore 52 for engagement between a shoulder 55 of said housing and a shoulder 56 on the plunger.

For withdrawing the plunger from the slots to render the one-way brake inoperative, the cam and cooperating follower means generally indicated at 57 is provided. This means comprises the movable cam member 58, the cam surface 59 of which consists essentially of a simple inclined plane. This cam 58 is guided for reciprocatory movement in guide 60 provided in the housing 51. This cam 58 projects through a slot 61 provided in the plunger 46 and engages with an antifriction follower 62 which may be of any suitable construction but which is shown in this illustration as a roller. It is obvious that movement of the cam 58 to the right of the position shown in Figure 4 will, by the engagement thereof with the roller, elevate the plunger against the pressure exerted by the spring 54 thereon. A reverse movement serves to lower the plunger under the force of said spring.

The cam 58 is reciprocated by means connected to the rod 63 which mounts said cam. This means may be connected to said rod 63 by means of the aperture 64 provided therein, or by any other suitable means.

For reciprocating said rod 63 in synchronism with the movements of the gear shifting members in the transmission, I provide an operating means which is connected to said gear shifting members in a transmission with consequent operation of my device upon movement of said members. In an ordinary transmission two gear shifting members are provided. These gear shifting members in use on most of the motor vehicles comprise two shafts situated in the transmission adapted for reciprocation forwardly and backwardly with the ends thereof projecting outwardly from the transmission casing. One of these shafts reciprocates between the reverse position and the low gear position, while the other shaft reciprocates between the second and third speed positions. In some automobile transmissions, the shafts do not project from the transmission and I must supply shafts for connection to the gear shifting member. In Figures 1, 2, 3 and 7 I show this portion of my device.

The rod 65 which is connected to the cam rod 63 by any suitable fastening means extending through the aperture 64 is moved backwardly and forwardly to control the operation of the one-way brake in synchronism with the movements of the transmission by the apparatus generally indicated at 66. This apparatus consists of a hollowed tubular shaft 67 connected to the gear shifting member controlling reversed and forward speeds and the shaft 68 with the laterally off-set striking portion 69 connected to the gear shifting member controlling second and third speed. These shafts control the movements of the rod 65 and consequently the movements of the one-way brake of my device by engaging at certain stages of operation of the gear shifting elements within the transmission the simple first-class lever 70, the shaft 67 being connected to said lever 70 by the slidably connected associated shaft 71, while the shaft 68 engages with said lever 70 by means of the striking portion 69 thereon. As appears in Figures 1, 2 and 7, the rod 65 is connected to the lever 70 as shown at 72 and is consequently controlled in its movements thereby. Any suitable means may be used to mount the pivot 73 of the lever. In this embodiment I show a bracket plate 74 secured to the transmission by bolt 75 or by any suitable means for accomplishing this object. A pivot bracket 76 may be used to form the connection if it is desired to elevate the lever.

From the foregoing description, the operation of my device is readily understood. In normal forward movement of the vehicle, the apparatus controlling the operation of the one-way brake is positioned as shown in Figure 3. This actuates the plunger into operative engagement with the notch ring 45 as shown in Figure 5. As shown in said Figure 3, the gear shifting lever 76a has been thrown rearwardly to the left, thereby actuating the gear shifting member, not shown, which controls the first gear speed forwardly carrying the hollow shaft member 67 therewith. This hollow shaft member 67 by engagement with the stop 77 on the slidable shaft 71 has moved the same to the position shown in said Figure 3. This movement carries forward the arm 78 of the lever 70 and forces backwardly arm 79 of said lever and attached shaft 65. This movement throws cam rod 63 backwardly into the position shown in Figure 4, thereby permitting the lowering of the plunger 46 under pressure of the spring 54 into engagement with the notches 50 of the ring 45. As hereinbefore set forth this fixes the notched ring 45 against movement. When the parts are so positioned motion of the vehicle in a forward direction may take place as the shaft 19 of the device will rotate in a clockwise direction as indicated by the arrow in Figure 5. It is obvious that motion of the shaft in this direction carrying the cam 30 therewith will compress the springs 41 and 42 between the shoulders 33 and 43 and the shoulders 34 and 44 respectively, thereby permitting movement relatively between said cam 30 and the brake shoe members 39 and 40 toward the more reduced portions 35 and 36 of the faces 31 and 32 of said cam with consequent decrease in the radial distances between said brake shoes and the center of the shaft 19. This movement of course, throws the brake shoes 39 and 40 into spaced relation with the inner periphery of the notched ring 45 allowing relative movement therebetween. When the parts are in this position, and the car is stopped on a slope or is urged rearwardly by any force whatsoever, the wheels will be braked against such rearward movement by this one-way brake means. This becomes clear when it is noted that if the shaft 19 is rotated anti-clockwise, that is in the opposite direction shown in Figure 5, the spring members 41 and 42 will be tensioned and relative motion between the cam faces 31 and 32 of the cam 30 and the brake shoes 39 and 40 respectively will take place. This relative movement will shift the brake shoes 39 and 40 towards the portions of the cam faces 31 and 32 having the greatest radial extent from the center of the shaft 19. It is obvious that such movement will force said shoes into frictional engagement with the stationarily-positioned ring 45 and that the force so acting will tend to increase with the torque exerted on said shaft, thereby effectively braking the wheels against any rearward movement.

If it is desired to assure the locking of the ring 45 for the performance of the one-way braking operation by shifting the gears into second gear without the intermediate step of operating the car under first gear, the striking arm 68 mounted on the said second gear control member is utilized. As is well known to those who drive automobiles when the gear shifting lever is actuated to second gear, the shaft upon which the gear control means is mounted is shifted to the rear. This movement forces the striking arm 68 into engagement with the end of the arm 79 of the lever 70, thereby assuring backward movement of said arm and attached rod 65.

When the operator shifts the gears from first or second to third gear, the lever 70 will remain in the position shown in Figure 3 due to the sliding connection between the shafts 67 and 71 which cooperate with the reverse and first gear control means and the adaption of the shaft 68 for movement of the lever 70 in one direction only by the simple striking means operating therebetween. For example, it is seen that the shaft 68 may be carried forwardly to set in motion the third gear from the position shown in either Figure 2 or 3 without interfering with the position occupied by the lever 70. It is thus seen that in any positions of forward gear arrived at through initial actuation of first or second gears, the one-way brake will be operated to allow forward motion, while preventing retrograde movement.

When it is desired to reverse the motion of the car by driving the same rearwardly under its own power, the operator simply shifts the gear shift lever to the position of reverse. This movement, as shown in Figure 7 throws the hollow shafts 67 rearwardly due to the connection thereof with the gear shift control member controlling the reverse and forward speeds. The hollow shaft member 67 by engagement with the stop 77 on the sliding shaft 71 actuates said shaft rearwardly moving arm 79 of the lever 70 and attached rod 65 forwardly. This movement translates the cam rod 63 into a forward position, that is, a position to the right of the place shown in Figure 4, thereby elevating the bolt 46 and releasing the ring 45 for free rotation. It can be clearly seen that the shaft 19 is then free to rotate clockwise or anti-clockwise carrying the ring 45 with the brake shoes and cam member or permitting the same to remain stationary upon forward movement and carrying said ring 45 with said shaft by means of the engagement with the brake shoes upon rearward rotation.

If the operator desires to permit rearward movement of the wheels by the use of means other than the use of the reverse gear, he simply draws the gear shift lever 76ª from the reverse position to the neutral position. This movement throws the gear shift member which reciprocates the hollow shaft 67 forwardly sufficiently, only, to permit movement of the stop 77 on the sliding shaft 71 to the end of the slot in the shaft 67 engaging therewith, thus permitting movement of said shaft 67 without disturbance of the position occupied by the sliding shaft 71. This operation is shown in Figure 2. Upon movement of the gear shift lever to any of the other three positions which are used for forward speed the one-way brake device will again be set into operation as heretofore set forth. Movement of the gear shift lever to neutral from any of the three forward speed positions will not render the one-way brake device inoperative as is easily understood. The only movement of the gear shift lever accomplishing this result is the movement into reverse or the movement from reverse into neutral.

It is thus seen that I have provided a one-way brake mechanism which, through synchronism with the gear shifting controls of the transmission effectively prevents rearward movement of the vehicle under those situations when such movement is least desired and provides for such rearward movement at the will of an operator.

The convenience of this device is easily understood. The machine will be held firmly upon an incline, whereon it may have been brought to a halt by whatsoever cause. The forward and upward movement may be resumed without reference to the usual brakes. The car will not roll backwards unless the driver throws the device to neutral from reverse or puts his car into reverse gear, thereby eliminating the necessity of any attention being given to the ordinary brakes in moving up an incline.

What I claim is:—

1. In a one-way brake for use on rotatable shafts, a freely rotatable friction ring positioned about said shaft having notches, means engageable with said friction ring and actuated by said shaft for stopping rotation of said shaft in one direction, a plunger for engaging said notches to fix said ring against rotation, a cam follower integral with said plunger and a cam adapted to engage said follower for reciprocating said plunger.

2. In an automobile having a transmission, an operating lever therefor, a one-way brake for preventing retrograde movement of said automobile, a reciprocating rod for operating said one-way brake to on and off positions and means for reciprocating said rod from said transmission lever comprising a lever pivoted at one end to said rod an operating rod pivotally connected to the opposite end of said lever and operated by the transmission lever for moving said one-way brake control rod in one direction when the transmission lever is moved to forward speed and in an opposite direction when said transmission lever is moved to reverse position, said transmission lever connecting rod having a lost motion connection therein for releasing the operative connection between said transmission lever and said second named lever when said transmission lever is moved to neutral position.

3. In an automobile having a transmission, a one-way brake a reciprocating rod for controlling the operation of said one-way brake, an oscillating lever for reciprocating said rod and means for oscillating said lever to move said rod to the on position when the transmission is positioned for forward speed and means for oscillating said lever to the off-position upon the moving of said transmission into reverse and to the neutral position from reverse.

4. In an automobile having a transmission, and a one-way brake, a reciprocating control rod for moving said brake into on and off positions and means for reciprocating said control rod in synchronism with the movements of said transmission, comprising an oscillating lever having one arm connected to the reciprocating rod and the other arm connected to the element of said transmission controlling the position of the gears for forward speed and reversed, and means engageable with the element controlling the position of other forward speeds of said transmission to oscillate said lever to move said rod to the on position when said element is positioned in one of said other forward speeds.

5. In an automobile having a transmission and a one-way brake, a reciprocating rod for positioning said one-way brake in the on and off positions and means for moving said reciprocating rod to operate said one-way brake in synchronism with the movements of said transmission, comprising an oscillating lever having one arm connected to said reciprocating rod and the other arm adapted for operation by the gear shift element controlling first and reverse speed and a striker arm movable with the element of the transmission controlling second and third speeds to assure oscillation of said lever in one direction to move the reciprocating rod to the on position when said gear shift element controlling the second and third speeds of the transmission is in the position of second speed.

6. In an automobile having a transmission including an operating lever and rotatable shaft, a freely rotatable friction ring positioned about said shaft and having notches, cam means engageable with said friction ring and actuated by said shaft for stopping rotation of said shaft in one direction, a plunger for engaging said notches to fix said ring against rotation, a cam follower integral with said plunger, a reciprocating rod, said rod having a cam adapted to engage said follower for reciprocating said plunger, and means for reciprocating said rod from said operating lever.

ALFRED B. SMALL.